(12) United States Patent
Edvardsson (10) Patent No.: US 7,481,672 B2
(45) Date of Patent: Jan. 27, 2009

(54) DIELECTRIC CONNECTOR, DC-INSULATING THROUGH-CONNECTION AND ELECTRONIC SYSTEM

(75) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 493 days.

(21) Appl. No.: 11/186,302

(22) Filed: Jul. 21, 2005

(65) Prior Publication Data

US 2007/0020998 A1    Jan. 25, 2007

(51) Int. Cl.
*H01R 9/05* (2006.01)
(52) U.S. Cl. .................. 439/578; 333/182; 333/260; 343/906; 343/702; 439/916
(58) Field of Classification Search .......... 439/578, 439/607, 916; 174/84 R, 88 R; 333/182, 333/183, 185, 260; 340/906, 702
See application file for complete search history.

(56) References Cited

U.S. PATENT DOCUMENTS

| | | | | |
|---|---|---|---|---|
| 4,398,164 | A * | 8/1983 | Nishikawa et al. | 333/222 |
| 4,631,506 | A * | 12/1986 | Makimoto et al. | 333/224 |
| 4,784,618 | A * | 11/1988 | Sakamoto et al. | 439/620.1 |
| 5,658,171 | A * | 8/1997 | Pauza et al. | 439/675 |
| 5,796,315 | A * | 8/1998 | Gordon et al. | 333/24 C |
| 5,954,526 | A * | 9/1999 | Smith | 439/136 |
| 6,593,857 | B1 * | 7/2003 | Roper et al. | 340/870.3 |
| 6,778,044 | B2 * | 8/2004 | Fehrenbach et al. | 333/260 |
| 7,014,502 | B2 * | 3/2006 | Rasmussen | 439/578 |
| 7,057,577 | B1 * | 6/2006 | Willoughby et al. | 343/906 |
| 7,391,600 | B2 * | 6/2008 | Handa | 361/302 |
| 2005/0088307 | A1 * | 4/2005 | Schaffer et al. | 340/612 |

FOREIGN PATENT DOCUMENTS

| | | |
|---|---|---|
| DE | 100 26 033 A1 | 12/2001 |
| DE | 100 26 033 C2 | 5/2006 |
| GB | 2 268 032 A | 12/1993 |
| WO | WO 98/57311 | 12/1998 |

OTHER PUBLICATIONS

"International Search Report" for PCT/SE2006/000754.

* cited by examiner

*Primary Examiner*—Renee Luebke
*Assistant Examiner*—Xuong M Chung-Trans
(74) *Attorney, Agent, or Firm*—Westman, Champlin & Kelly, P.A.

(57) ABSTRACT

A dielectric connector, for coupling radio-frequency signals from a signal generating device disposed inside an explosion-proof housing to a signal receiving device arranged outside the housing. The connector is configured to be sealingly inserted in an opening in the housing, and adapted to receive, from the inside of the housing, at least one internal conducting member, and receive, from the outside of the housing, at least one external conducting member. At least one of the conducting members is partly inserted in the connector and reactive (capacitive and/or inductive) coupling and galvanic separation is provided between the signal generating device and the signal receiving device.

A combination of strong reactive coupling and secure operation in hazardous environments is enabled through the dielectric connector according to the present invention.

42 Claims, 4 Drawing Sheets

DIELECTRIC CONNECTOR, DC-INSULATING THROUGH-CONNECTION AND ELECTRONIC SYSTEM

TECHNICAL FIELD OF THE INVENTION

The present invention relates to a dielectric connector and a DC-insulating through-connection for coupling radio-frequency signals from a signal generating device disposed inside an explosion-proof housing to a signal receiving device arranged outside the housing. The signal path through the connector can be unidirectional or bidirectional.

The invention further relates to an electronic system for use in a hazardous environment.

TECHNICAL BACKGROUND

Installation of industrial measuring and monitoring systems, such as a radar level gauge system, are often time-consuming and expensive. Such systems generally comprise a number of electronic systems, such as sensors for measurement of filling level, temperature, pressure etc. These electronic systems typically need to communicate with a central controlling unit and/or each other. During installation of such systems a substantial amount of cabling consequently has to be laid out. The environment is often difficult, perhaps with corrosive or hazardous fluids, and cables and/or cable-wall interfaces typically need to be sealed in order to provide an explosion-proof system.

Since, due to the difficult environment, cabling costs usually end up in the same range as material costs and sometimes even higher, use of wireless systems has naturally been contemplated, but so far not particularly widely used.

The cost for necessary radio hardware has in recent years decreased dramatically, and consequently this cost alone is no big obstacle for a widespread use in, for instance, high-grade industrial sensors for level, pressure, flow etc.

One of the main reasons that wireless communication is not more widespread than it is in an industrial environment, despite the previously mentioned reduced cost of hardware, is that those low-cost, mass-produced radio transmitters and receivers are generally not adapted for use in an industrial environment. Specifically, there are certain harsh requirements on electronics to be used in a hazardous environment, for example where explosive gases are potentially present in the atmosphere. The term hazardous is conventionally used to characterize such environments and special rules and regulations often applies to make electrical equipment reduce such potential danger.

Therefore, industrial wireless applications using conventional solutions today typically include a separate (explosion-proof) box containing a radio modem, an antenna and cabling. Put together, these auxiliary arrangements for achieving a unit suitable for an industrial environment will be an order of magnitude more expensive than the actual active radio hardware.

In order to enable economically viable use of wireless communication between industrial electronic units, there is thus a need for an inexpensive arrangement allowing for the use of inexpensive mass-produced radio hardware in an industrial environment.

DE 100 26 033 discloses a measurement transducer for use in a hazardous environment. The disclosed transducer is contained in a pressure-tight metal housing. The metal housing has a dielectric window, through which high-frequency signals are capacitively coupled through surface patches to an antenna on the outside of the dielectric window. The formal requirements for an encapsulation able to contain internal explosions is conventionally referred to as explosion-proof or flame-proof.

A problem confronted when designing such capacitive coupling arrangements through an explosion-proof housing is to get a sufficiently strong signal coupling while keeping the dielectric portion of the housing strong enough.

In an arrangement such as that disclosed in DE 100 26 033, the dielectric window would need to be made very thin in order the obtain a satisfactory signal-to-noise ratio of the wireless signal. As a consequence, there appears to be a non-negligible risk of mechanical failure of the housing. Thus, there is a big difficulty with this proposed design to fulfill both the mechanical strength to contain possible explosions and to enable a sufficiently good capacitive coupling.

Consequently, there is a need for a high-frequency coupling arrangement for a hazardous environment, enabling construction of a more robust explosion-proof equipment housing.

OBJECTS OF THE INVENTION

In view of the above-mentioned and other drawbacks of the prior art, a general object of the present invention is to provide an improved arrangement for DC-insulating feed-through of radio-frequency signals through an explosion-proof housing, as well as an electronic system utilizing such a DC-insulating feed-through.

A further object of the present invention is to enable a more robust arrangement for DC-insulating feed-through of radio-frequency signals through an explosion-proof equipment housing, as well as a more robust electronic system for use in a hazardous environment.

SUMMARY OF THE INVENTION

According to a first aspect of the invention, these and other objects are achieved through a dielectric connector, for coupling radio-frequency signals from a signal generating device disposed inside an explosion-proof housing to a signal receiving device arranged outside the housing, wherein the connector is configured to be sealingly inserted in an opening in the housing, and adapted to receive, from the inside of the housing, at least one internal conducting member, the at least one internal conducting member being connected to the signal generating device, and receive, from the outside of the housing, at least one external conducting member, the at least one external conducting member being connected to the signal receiving device, wherein said connector partly encloses at least one of the conducting members and, wherein said connector provides reactive coupling and galvanic separation between the signal generating device and the signal receiving device, when said conductive members are received by said connector.

By "dielectric connector" is meant a new type of component, as discussed in detail in this application. However, it is not to be confused with conventionally used electric connectors, and does e.g. not imply that the component should be conductive.

By "radio-frequency signals" should be understood electromagnetic signals at a frequency suitable for radio-communication, typically from about 10 MHz to a few GHz.

A "signal generating device" should here be understood as a device capable of generating radio-frequency signals. Such a device may, for example, be a radio-transmitter or a radio-transceiver. In the case of a radio-transceiver, bi-directional communication can take place through the dielectric connector. Suitable signal generating devices include transmitters or transceivers for any one of WLAN, Bluetooth, GSM, AMPS, PHS etc.

A "signal receiving device" is here a device capable of receiving radio-frequency signals generated by the signal generating device. Examples of such signal receiving devices include various types of antennas, cables and adapters for use with cables and/or antennas. Antennas can be directly connected to the dielectric connector of the invention or indirectly, through a cable. The combined possibility of connecting either an antenna or a cable (e.g. to a more distant antenna) to the connector is a practically important feature.

By "sealingly inserted" is meant that an interface between the dielectric connector and the housing becomes pressure-tight to such a degree that the housing including the dielectric connector can be classed as explosion-proof according to relevant regulations.

By "galvanic separation" is in this application meant a conductive separation that precludes a DC flow through the connection. More specifically, the galvanic separation of this invention not only provides DC-insulation, but also efficiently stops all currents having a frequency of a few MHz and lower, thereby allowing only radiofrequency signals to pass.

The "reactive coupling" can, in terms of this application, be either only a capacitive coupling, only an inductive coupling, or a combination of a capacitive and inductive coupling. Non-galvanic radio-frequency coupling is most times capacitive, but may also be a combination of capacitive and inductive. By a suitable combination of capacitive and inductive coupling a sufficiently strong coupling can be achieved in spite of rather thick dielectric materials, e.g. being able to withstand pressure in connection with explosions).

Through the dielectric connector according to the first aspect of the present invention a DC-insulating feed-through between the inside and the outside of an explosion-proof housing is accomplished. Through this DC-insulation, standard types of signal generating devices can be used in a hazardous environment, possibly without having to re-certify devices in which this dielectric connector is used. By enabling use of standard type, mass-produced signal-generating devices, total costs of material and installation of industrial electronic units can be substantially reduced.

When the term "hazardous environment" is used herein, it is in particular referred to an environment in which explosive gases are present in the atmosphere With the expression "DC-insulating feed-through" should here be understood a feed-through effectively preventing coupling of signals of frequencies from 0 Hz to several MHz. A small capacitance (a few pF in most practical cases) is typical used for the coupling, thus efficiently preventing all electrical power except for the radio signals to pass. When used in explosion protected electrical equipment, this small capacitance simplifies the use of a coupling which is regarded as fail-safe (a certain thickness such as 1 mm etc.) and it also gives an improved protection against over-voltages occurring during thunderstorms, etc.

By configuring the dielectric connector such that at least one of the conducting members is partly inserted in the connector, a strong reactive coupling can be achieved through the feed-through formed by the connector even if the dielectric connector is made so thick that the reactive coupling between surface patches on the connector would be quite insufficient.

Thus, a combination of strong reactive coupling and secure operation in hazardous environments is enabled through the dielectric connector according to the present invention.

According to one embodiment of the dielectric connector according to the invention, the connector may be adapted to receive the at least one internal conducting member and the at least one external conducting member such that both the internal and external conducting members are partly inserted in the connector.

By configuring the dielectric connector so that both internal and external conducting members can be inserted in the connector, reactive coupling can occur inside the connector. The connector can be adapted to receive internal and external conducting members through insertion along a line, whereby ends of the conducting members would face each other and the reactive coupling take place between these ends. More preferably, the connector may be adapted to receive internal and external conducting members in essentially parallel directions of insertion and offset, such that portions of the inserted internal and external conducting members overlap in a direction parallel to the directions of insertion.

A strong reactive coupling can be achieved through this overlap. In fact, the strength of the reactive coupling between the internal and external conductive members can be made essentially independent of the physical thickness (in an axial direction of the opening in the housing) of the dielectric connector. The dielectric connector according to the present embodiment can thus be designed for strong reactive coupling without having to compromise the mechanical strength of the explosion-proof housing including the dielectric connector.

The at least partly inserted conducting member may further be inserted more than 20 percent and less than 80 percent of an extent of the dielectric connector in a direction of insertion, in order to, at the same time, achieve sufficient mechanical strength and reactive coupling strength.

According to another embodiment of the dielectric connector according to the present invention, the connector may be configured to enable resonant coupling between the at least one internal conducting member and the at least one external conducting member.

With this resonant coupling, capacitive and inductive couplings are tuned together leading to a considerably much more efficient coupling at and around a resonance frequency. More specifically, the term resonant coupling is often used for the case where resonant circuits or wavelength-related pieces of certain associated lengths ($\lambda/4$, $\lambda/2$, etc) are chosen.

Through this arrangement, an even stronger coupling can thus be achieved within a specified frequency band. In other words, it becomes possible to selectively amplify signals of particular wavelengths through resonance. This additional amplification may, for example, be used to expand manufacturing tolerances, provide even more mechanical strength or band-pass filter outgoing (and incoming) signals in order to reduce disturbance.

This resonant coupling can be achieved through adapting the dielectric connector to receive the at least one internal conducting member and the at least one external conducting member such that the internal and external conducting members are partly inserted in the dielectric connector in essentially parallel directions of insertion, and to enable an overlap between the conducting members in a direction parallel to the directions of insertion.

Suitably, an electric length of the overlap essentially corresponds to a quarter of a wavelength of the radio-frequency signals.

The "electric length" depends on which material is transversed by the electromagnetic signals. The electrical length is obtained by modifying a physical length using a relative permittivity according to the following relation:

$$L_{electric} = L_{physical} * \sqrt{\epsilon_r}$$

By configuring the dielectric connector such that the electric length of the overlap becomes $\lambda/4$, a resonating structure is obtained. Through this structure, electromagnetic signals with wavelengths around $\lambda$ are amplified.

This resonating structure also resonates at $3\lambda/4$, $5\lambda/4$, etc. The electric length of the overlap may consequently be: $\lambda/4 + n\lambda/2$, $n=0, 1, 2, \ldots$ Such higher order resonances may be utilized, for example, for designing a dielelectric connector for high frequency signals or for multiple radio bands. In the latter case, the dielectric connector according to the present embodiment may be configured to support resonance at two or more frequencies in different radio-frequency bands. The circuits can be modified to allow the frequency bands to be related to each other in any way, and not just like integers.

The dielectric connector may further be configured to receive several internal and/or external conducting members. This may, for example, be useful for achieving resonance through a shorter overlap than would be the case with a single pair of internal and external conducting members. Furthermore, so called diversity may be accomplished by connecting several signal receiving devices through the dielectric connector to corresponding input ports on the signal generating device. Thereby, a signal strength on the input ports can continuously be monitored and the port currently having the best signal-to-noise ratio be selected.

At least one of the internal and external conducting members may further have a non-straight extension in a vicinity of the dielectric connector. By at least partly forming overlapping internal and external conducting members in non-straight shapes, such as any one of zig-zag-shape, meander-shape and coil-shape, resonance can be achieved with a shorter overlap than is possible with straight conducting members which are overlapping. At least partly non-straight conducting members may be especially useful when designing a dielectric connector for use with lower frequencies, such as in the range of 400 MHz. Through the use of at least partly non-straight conducting members, a more compact dielectric connector can be realized.

Resonant coupling can further be achieved through a dielectric connector comprising an intermediate coupling member arranged to enable resonant coupling between the at least one internal conducting member and the at least one external conducting member.

Preferably, the dielectric connector may be adapted to receive the at least one internal conducting member and the at least one external conducting member such that the internal and external conducting members are partly inserted in the dielectric connector in essentially parallel directions of insertion, the intermediate coupling member may be embedded in the dielectric connector, and the resonant coupling may be enabled through overlaps, in a direction parallel to the directions of insertion, between each of the conducting members and the intermediate coupling member.

An "intermediate coupling member" is here a coupling member which is capable of capacitively relaying signals from an internal conducting member to an external conducting member. The intermediate coupling member may typically be a metal resonator embedded in the dielectric resonator.

By embedding an intermediate coupling member in the dielectric connector, electric symmetry can be obtained in the coupling between internal and external conductive members, whereby electric matching of the dielectric connector is facilitated and manufacturing and assembly tolerances widened.

The intermediate coupling member may have a non-straight extension in a vicinity of the connector. In cases when the intermediate coupling member is formed as a metal resonator, the total length of the resonator can thereby be reduced compared to using a straight piece of metal.

The embedded intermediate coupling member may comprise a non-straight conductor, preferably supported by a dielectric material. For example, the non-straight conductor may be formed as a coil, which can be filled with a dielectric in order to maintain pressure stability required for explosion-proof testing and certification of the dielectric connector or industrial electronic equipment comprising the dielectric connector.

The dielectric connector may further be connectable to at least one of an antenna, a cable and an adapter accommodating either an antenna or a cable or both simultaneously.

In order for the dielectric connector to be useful for as large a range of applications as possible, the dielectric connector is preferably arranged to admit selection of signal receiving member after installation or, alternatively, the choice not to install any signal receiving member at all.

The antenna may be connected directly to the dielectric connector or may be connected via a cable and placed at a location with better sending/receiving conditions.

The connector is preferably provided with essentially planar end surfaces facing the interior and exterior of the housing, respectively. Preferably, the intermediate part between the end surfaces is of a form matching the opening of the housing in which it is to arranged, such as being essentially circular in cross-section. Consequently, the connector is preferably of an essentially cylindrical shape.

According to a second aspect of the invention, the above-discussed and other objects are achieved by an electronic system, for use in a hazardous environment, comprising a signal generating device configured to generate radio-frequency signals, the signal generating device being arranged within an explosion proof housing, a signal receiving device arranged outside the housing, a dielectric connector sealingly inserted in an opening in the housing, at least one internal conducting member arranged inside the housing and connecting the signal generating device and the dielectric connector, and at least one external conducting member arranged outside the housing and connecting the signal receiving device and the dielectric connector, wherein at least one of the conducting members is partly inserted in the connector, and wherein reactive coupling and galvanic separation is provided between the signal generating device and the signal receiving device.

The "electronic system" may here be any electronic system suitable for use in an industrial environment, and especially a hazardous environment.

Examples of such systems include different types of sensing systems for measuring, for example, level, temperature, pressure, flow, etc; control systems for controlling, for example, process parameters; and relay systems for relaying data to and from other industrial systems, which may be designed to be intrinsically safe.

Particularly, the electronic system may be a gauging system, for measuring a filling level in a tank, comprising at least one sensing unit configured to convert a sensed physical parameter into corresponding electrical sensor signals and a signal generating device configured to generate radio-frequency signals corresponding to the sensor signals.

This gauging system may, for example, be a radar level gauge system.

By "tank" should here be understood any kind of vessel used for keeping material for shorter or longer times. Examples of tanks include land-based containers, tanks in tanker ships, moveable cargo-tanks, process tanks used in the chemical and process industries etc. Materials stored or kept in tanks may be any kind of solid, liquid or gaseous matter.

The above-mentioned "sensing unit" may be any kind of unit capable of converting a physical parameter to electrical signals, directly or indirectly.

Through the electronic system according to the second aspect of the present invention, wireless communication between such electronic systems (such as radar level gauge systems, temperature sensing systems, pressure sensing systems and flow sensing systems) and between electronic systems and one or several control systems is enabled. The control system may also be an electronic system.

Further effects analogous to those described above in connection with the first aspect of the invention are also obtained through this second aspect of the present invention.

According to one embodiment of the electronic system according to the second aspect of the present invention, the signal receiving device is at least one of a quarter-wave whip antenna, a half-wave whip antenna, a loop antenna and a PIFA-type antenna.

PIFA means planar inverted F-antenna and variations of it are well suited for low-profile antennas. A loop antenna is in a wide sense shaped like al loop and both the loop and PIFA-antenna can, in contrast to said whips, be solidly grounded, which is important to improve resistance to over-voltage.

According to one embodiment of the electronic system according to the second aspect of the present invention, the signal receiving device is configured to protect the industrial electronic unit from over-voltage.

Over-voltage may occur, for example, as a consequence of a lighting strike in the vicinity of the signal receiving device (such as an antenna). Through the above-mentioned configuration of the signal receiving device, the electronic system may be protected from over-voltage, whereby safety is increased in a hazardous environment.

The signal receiving device may be grounded, for example through connection to the housing, given that the housing is made of metal, which is often the case in explosion-proof applications. When connected to the housing, the signal receiving device may, for example, be a suitably configured PIFA-antenna.

The electronic system according to the second aspect of the present invention may have a dielectric connector which can be configured to accommodate a plurality of signal receiving devices.

Use of wireless transmission is highly regulated and limited to a number of well-defined frequency bands. These bands may be different for different regions or countries. By equipping the electronic system of the second aspect of the invention with a dielectric connector capable of accommodating a number of different signal receiving devices, such as antennas, the electronic system can be adapted for use of different frequency bands and consequently also for sale and use in different markets. Furthermore, as discussed in connection with the first aspect of the present invention, diversity is enabled.

According to a third aspect of the invention, the objects stated above and others are achieved by a DC-insulating through-connection, for coupling radio-frequency signals from a signal generating device disposed inside an explosion-proof housing to a signal receiving device arranged outside the housing, the through-connection comprising at least one internal conducting member, from the inside of the housing, connected to a dielectric coupling member, the at least one internal conducting member being connected to the signal generating device, and at least one external conducting member, from the outside of the housing, connected to the dielectric coupling member, the at least one external conducting member being connected to the signal receiving device, wherein the through-connection is configured to enable resonant coupling between the conducting members through the dielectric coupling member, thereby providing resonant reactive coupling and galvanic separation between the signal generating device and the signal receiving device.

The "dielectric coupling member" is a dielectric member capable of connecting to internal and external conducting members, either as surface patches or inserted into the dielectric coupling member as described in relation to the first aspect of the present invention. The dielectric coupling member may be an integral part of a dielectric housing or it may be provided in the form of a window or a plug. The window or plug would then be sealingly arranged in an opening in the explosion-proof housing.

Through the resonant coupling, a strong reactive coupling can be achieved within a specified frequency band. It thus becomes possible to selectively amplify signals of particular wavelengths through resonance. Thanks to this amplification, the thickness of the dielectric coupling member (in the direction of the through-connection, i.e. perpendicularly to the housing wall) can be increased and thus also the mechanical strength of the housing including through-connection.

The through-connection according to the present aspect of the invention is particularly useful for applications where the explosion-proof housing is non-metallic, for example plastic.

As previously mentioned, the resonance amplification may, for example, also be used to band-pass filter outgoing (and incoming) signals in order to reduce disturbance.

The resonant coupling may be enabled through an overlap between the conducting members, the overlap being perpendicular to a direction of the DC-insulating through-connection.

One way of achieving the resonant coupling is to apply the internal and external conducting members on the dielectric coupling member so that a suitable overlap is formed. As previously described, in relation to the first aspect of the present invention, a suitable length of the overlap is a quarter of a wavelength of the radio-frequency signals or certain multiples thereof as previously described.

Another way of achieving the resonant coupling is to arrange an intermediate coupling member to enable resonant coupling between the internal and external conducting members.

According to one embodiment of the DC-insulating through-connection according to the third aspect of the invention, the intermediate coupling member can be embedded in the through-connection, and the resonant coupling be enabled through a first reactive coupling in a direction of the through-connection between the internal conducting member and the intermediate coupling member, and a second reactive coupling in the direction of the through-connection between the intermediate coupling member and the external conducting member.

Typically, the intermediate coupling member may be embedded in the dielectric coupling member, sandwiched between internal and external conducting members. The intermediate coupling member may, for example, be a $\lambda/2$- piece of solid metal a coil, zig-zag or meander line to decrease a length of the intermediate coupling member (λ/2 in PTFE is around 100 and 40 mm respectively at 1 GHz and 2.5 GHz). One suitable type of intermediate coupling member may be a coil, having a few turns and plates at the ends. The coil may be filled with a dielectric material to maintain pressure stability required for explosion proof testing.

Through this addition of an embedded intermediate coupling member, the dielectric coupling member can be made thicker and stronger and the complete explosion-proof housing thus made more robust. Alternatively or in combination, the effect of the intermediate coupling member can be utilized to improve signal quality, reduce transmission power or/and expand the selection of possible radio-transmission hardware.

As previously mentioned, in the context of the first aspect of the invention, the through-connection of the present aspect may also be connectable to a number of different signal receiving devices.

According to a fourth aspect of the invention, the objects stated above and others are achieved by a electronic system, for use in a hazardous environment, comprising a signal generating device configured to generate radio-frequency signals, an explosion proof housing containing the signal generating device, a signal receiving device arranged outside the housing, a DC-insulating through-connection comprising at least one internal conducting member arranged, from the inside of the housing, on a dielectric coupling member, the at least one internal conducting member being connected to the signal generating device, and at least one external conducting member arranged, from the outside of the housing, on the dielectric coupling member, the at least one external conducting member being connected to the signal receiving device, wherein the through-connection is configured to enable resonant coupling between the conducting members through the dielectric coupling member, thereby providing resonant reactive coupling and galvanic separation between the signal generating device and the signal receiving device.

Through the electronic system according to this fourth aspect of the present invention, wireless communication between such electronic systems (such as radar level gauge units, temperature sensing units, pressure sensing units and flow sensing units) and between electronic systems and one or several control unit is enabled. The control unit may also be an electronic system.

Further effects analogous to those described above in connection with the other aspects of the invention are also obtained through this fourth aspect of the present invention.

According to still another aspect of the invention, there is provided a radar level gauge system for determining a filling level of a filling material in a container, comprising:

a transmitter for transmitting measuring signals towards the surface of the filling material;

a receiver for receiving echo signals from the container, wherein the receiver has a signal generating device configured to generate radio-frequency signals, said signal generating device being arranged within the container;

processing circuitry for calculating based on the reflected microwave signals a distance to a substance with a reflective surface in the container, wherein the processing circuitry is connected to a signal receiving device arranged outside the container;

a dielectric connector sealingly inserted in an opening in said container;

at least one internal conducting member arranged inside said tank and connecting said signal generating device and said dielectric connector; and at least one external conducting member arranged outside the container and connecting said signal receiving device and said dielectric connector;

wherein at least one of said conducting members is partly inserted in said connector, and wherein reactive coupling and galvanic separation is provided between said signal generating device and said signal receiving device.

Similar advantages as discussed above in relation to the other aspects of the invention are obtainable by means of this aspect. In one line of embodiments, the transmitter is adapted to emit continuous signals, and wherein the processing circuitry is adapted to calculate the distances based on a phase difference between the received echo signal and a reference signal. According to another line of embodiments, the transmitter is adapted to emit pulsed signals, and wherein the processing circuitry is adapted to calculate distances based on the time between the emission of a pulsed signal and the reception of the echo of said signal.

According to still another aspect of the invention, there is provided a radar level gauge system for determining a filling level of a filling material in a container, comprising:

a transmitter for transmitting measuring signals towards the surface of the filling material;

a receiver for receiving echo signals from the container, wherein the receiver has a signal generating device configured to generate radio-frequency signals, said signal generating device being arranged within the container;

processing circuitry for calculating based on the reflected microwave signals a distance to a substance with a reflective surface in the container, wherein the processing circuitry is connected to a signal receiving device arranged outside the container;

a dielectric connector sealingly inserted in an opening in said container;

at least one internal conducting member arranged, from the inside of said housing, to the dielectric connector, said at least one internal conducting member being connected to said signal generating device, and at least one external conducting member arranged, from the outside of said housing, to said dielectric connector, said at least one external conducting member being connected to said signal receiving device, wherein said dielectric connector is configured to enable resonant coupling between said conducting members, thereby providing resonant reactive coupling and galvanic separation between said signal generating device and said signal receiving device.

Similar advantages as discussed above in relation to the other aspects of the invention are obtainable by means of this aspect.

BRIEF DESCRIPTION OF THE DRAWINGS

These and other aspects of the present invention will now by way of example be described in more detail, with reference to the appended drawings showing currently preferred embodiments of the invention. On the drawings.

DETAILED DESCRIPTION OF PREFERRED EMBODIMENTS OF THE INVENTION

In the following description, the present invention is described with reference to a radar level gauge system. It should be noted that this by no means limits the scope of the invention, which is equally applicable to many other electronic systems.

In the present description, like reference numerals identify corresponding or similar structures and components.

Figure 1:
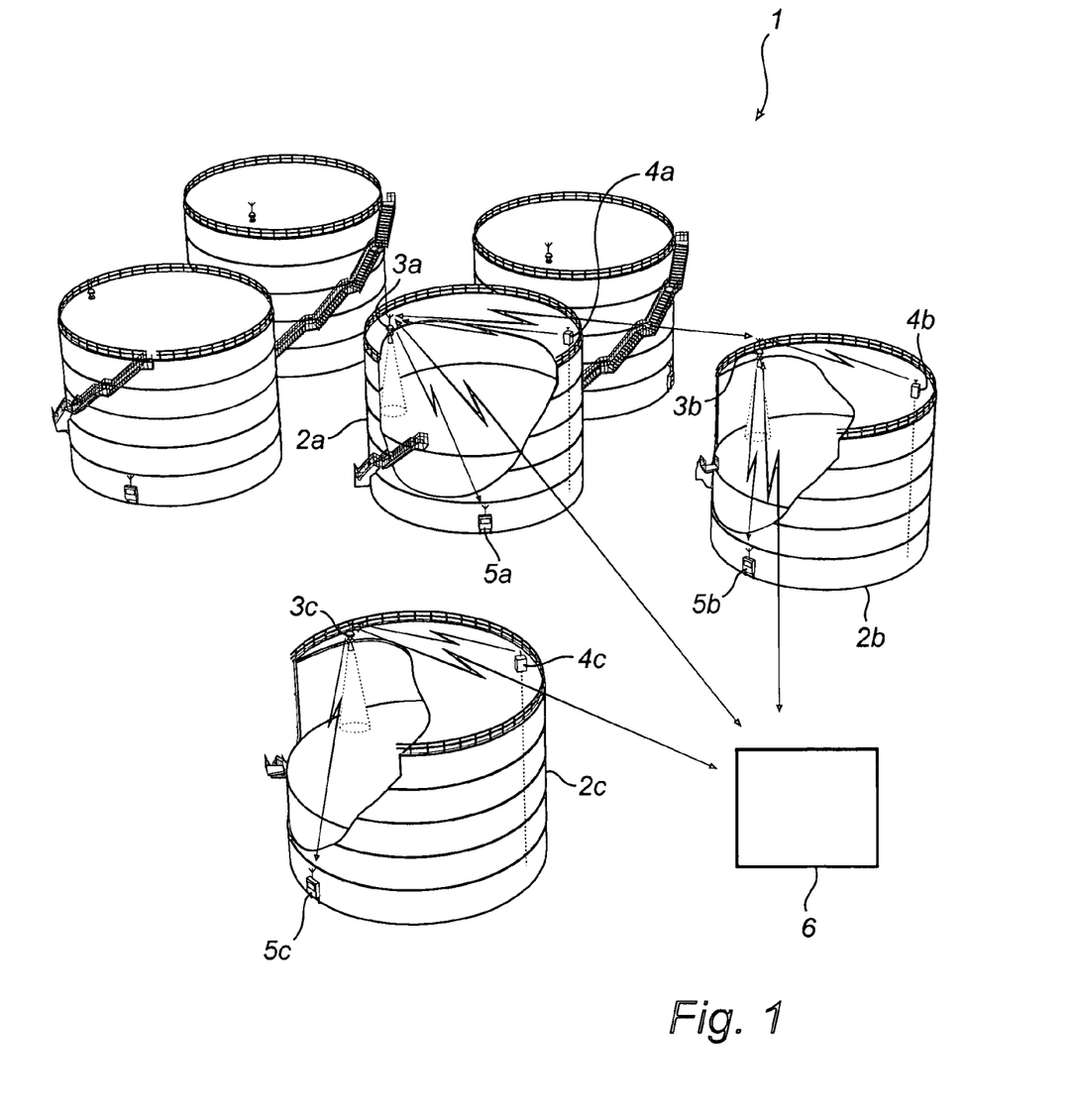
FIG. 1 is a schematic illustration of an example of an application of the present invention.

In FIG. 1, an example of an application for electronic systems according to the present invention is shown. Here, a land-based radar level gauge system 1 comprising three tanks 2a-c is shown. Each of the tanks is equipped with a gauging system comprising three electronic systems in the form of a radar level gauge 3a-c, a temperature measuring unit 4a-c and a display unit 5a-c. In this case, as illustrated in the figure, the radar level gauge units 3a-c are configured for bi-directional wireless communication with a central control unit 6 and with each other 3a-b, for wirelessly receiving from the temperature measuring unit 4b and for wirelessly transmitting to the display units 5a-c. Using conventional electronic units, this configuration would require a non-negligible amount of cabling. This is especially the case since the shown application is an outdoor application which might involve rather long distances between electronic units and between such units and the central control unit 6. However, by use of wireless transmission, these problems are alleviated.

Figure 2A:
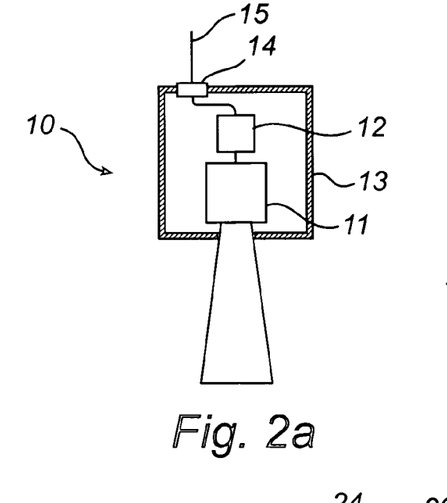
FIGS. 2a-b are schematic cross-section views of two embodiments of the electronic system according to the present invention.
Figure 2B:
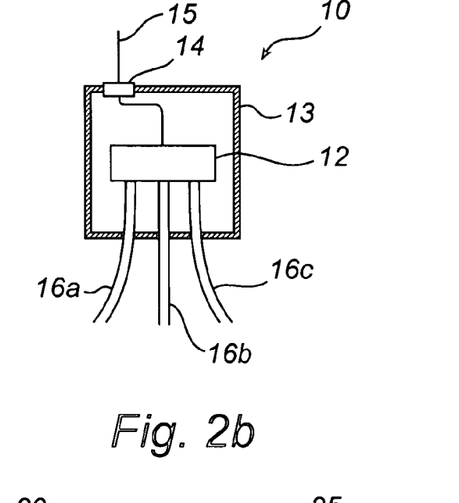

In FIG. 2a-b, first and second embodiments of an electronic system 10 for use in a hazardous environment are shown. These embodiments are equally applicable for the second and fourth aspects of the present invention.

According to the first embodiment, shown in FIG. 2a, a sensing unit 11 is configured to convert a sensed physical parameter, in this case a distance, into corresponding electrical sensor signals which are passed on to a signal generating device 12, in the form of a radio-transceiver, which is configured to generate radio-frequency signals corresponding to the sensor signals. The radio-transceiver 12 is contained in an explosion-proof housing 13 and the signals generated by the radio-transceiver 12 are fed through the housing 13 through a DC-insulating feed-through 14 to a signal receiving device 15 in the form of a whip antenna. The DC-insulating feed-through 14 may be provided in the form of either the dielectric connector according to the first aspect of the present invention or the DC-insulating through-connection according to the third aspect of the invention.

According to the second embodiment, shown in FIG. 2b, the sensing unit of the first embodiment is replaced by a number of cables 16a-c through which data from several sensing units or other electronic systems can be received by the signal generating device. For example, the cables can be connected to a radar level gauge, a temperature sensing unit and a pressure sensing unit (these units are not shown in the figure). Data from these units, at least some of which may be designed to be intrinsically safe, can be wirelessly transmitted in a manner described above to, for example, a central control unit 6.

Figure 3A:
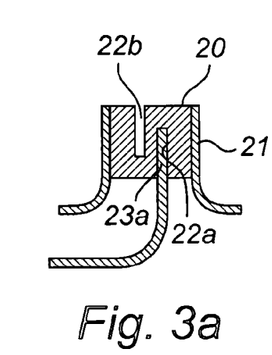
FIGS. 3a-c are schematic cross-section views of a first embodiment of the dielectric connector according to the present invention, having different signal receiving device configurations.
Figure 3B:
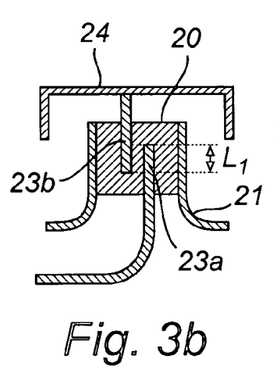
Figure 3C:
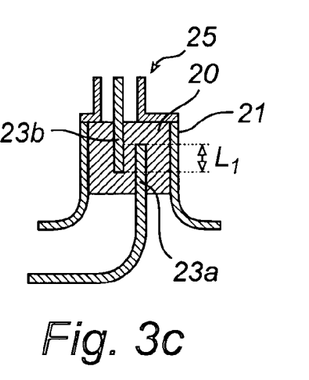

In FIGS. 3a-c schematic cross-section views of a first embodiment of the dielectric connector according to the present invention, having different signal receiving device configurations are shown.

In FIG. 3a, a dielectric connector 20, in the form of a plug, is shown sealingly inserted in an opening in an explosion-proof metal housing 21. The connector 20 is equipped with two holes or pockets 22a-b, which are made to accommodate suitably shaped conducting members. In this example, the inner hole 22a is filled with an internal conducting member 23a, while the outer hole 22b is empty. In this configuration, the electronic system having the connector 20 is prepared for explosion-safe wireless communication, but there is no signal receiving device installed. The shown configuration is a suitable standard configuration for a connector 20 in an electronic system intended for either wired or wireless communication. A suitable material for the dielectric connector 20 is an adequate plastic material (like PTFE or PPS) which is used for explosion proof seals (requiring good chemical and thermal strength). A diameter of the plastic plug forming the dielectric connector should be sufficient to allow prescribed insulation distance (typically at least 1 mm) between internal and external conducting members. Consequently, 10-30 mm is a likely exterior diameter with a diameter of 1-3 mm for the conducting members. The conducting members are formed as pins made of solid metal. Preferably, the insulation distance between the conducting members, in this case the pins, is made sufficiently large with regard to regulations for explosion protection by intrinsic safety. Such a minimum distance is typically 1 mm assuming worst case manufacturing tolerances.

In FIG. 3b, the dielectric connector 20 of FIG. 3a is shown having an outer conducting member 23b inserted in the outer hole 22b. The outer conducting member 23b is connected to a signal receiving device 24 in the form of an antenna, which may equally well be provided in the form of a whip-type antenna. In order to achieve a strong capacitive coupling between the internal conducting member 23a and the external conducting member 23b, an overlap in a direction parallel to the directions of insertion of the conducting members 23a-b is provided. The length $L_1$ of the overlap is chosen to achieve resonance at the frequency of the radio-frequency signals emitted through the internal conducting member 23a. Typically, this length $L_1$ is chosen such that the electric length of the overlap corresponds to a quarter of the wavelength of the radio-frequency signals. At for instance 0.8-1 GHz (where some commercially interesting frequency bands are located) $L_1$ is around 55 mm in PTFE. At a higher frequency (2-2.5

GHz where some WLANs and the US GSM-band is located) the length would be less than half the above quoted figure.

In FIG. 3c, the signal receiving member is provided in the form of a cable connector 26 for connection of a coaxial cable (not shown). This cable can lead to an antenna positioned at a location having better reception conditions or, alternatively, directly to another electronic system such as a central control unit 6.

Figure 4:
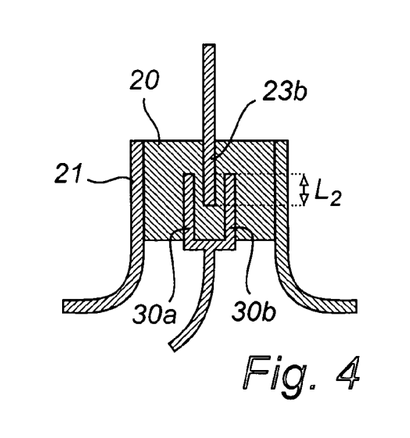
FIG. 4 is a schematic cross-section view of a second embodiment of the dielectric connector according to the present invention, having two internal conducting members.

In FIG. 4, a schematic cross-section view of a second embodiment of the dielectric connector according to the present invention, having two internal conducting members is shown. According to this second example, the single internal conducting member 23a of FIGS. 3a-c has been replaced by two internal conducting members 30a-b which are inserted in the dielectric connector 20 on either side of the external conducting member 23b with an overlap $L_2$. Through this arrangement, a resonant coupling can be achieved with a considerably shorter overlap. Typically, given that the rest of the relevant dimensions are essentially equal, the overlap $L_2$ can in this case be made about half as long as the overlap $L_1$ in the first example.

Figure 5:
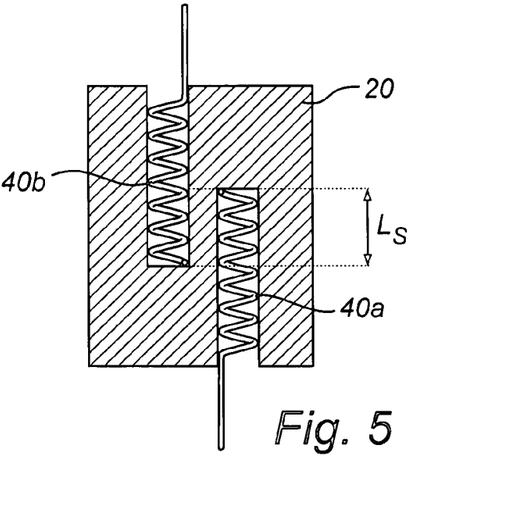
FIG. 5 is a schematic cross-section view of a third embodiment of the dielectric connector according to the present invention, having non-straight internal and external conducting members.

Referring now to FIG. 5, a third embodiment of the dielectric connector 20 according to the present invention is described. According to this embodiment, partly non-straight internal and external conducting members 40a-b are provided. By giving these conducting members 40a-b a suitable shape (such as a coil or spiral shape) an quarter wave coupling overlap $L_s$ can be made 2-3 times shorter than the overlap $L_1$ for a single pair of straight conducting members, by decreasing the propagation velocity and thus the waveguide wavelength.

Figure 6A:
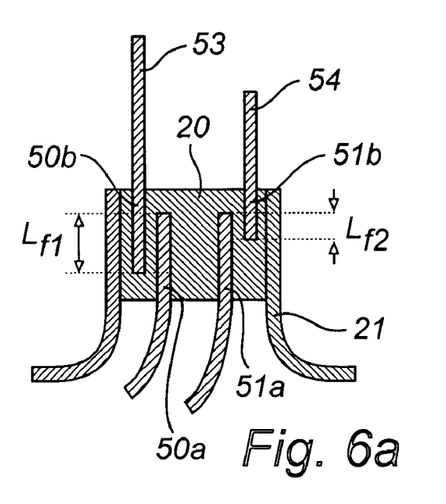
FIG. 6a is a schematic cross-section view of a first example of a fourth embodiment of the dielectric connector according to the present invention, having multiple signal receiving devices designed for different radio-frequency bands.

In FIG. 6a, a first example of a fourth embodiment of the dielectric connector 20 according to the invention is schematically shown. This connector 20 is designed to accommodate two different radio-frequency bands through the provision of two pairs of internal 50a, 51a and external 50b, 51b conducting members. Between each pair 50a-b, 51a-b, there is a respective overlap $L_{f1}$, $L_{f2}$. The overlap $L_{f1}$ between the first pair of conducting members 50a-b is designed to enable quarter-wave coupling for signals frequency $f_1$, while the overlap $L_{f2}$ between the second pair of conducting members 51a-b is designed to enable quarter-wave coupling for signals frequency $f_2$. Both internal conducting members 50a, 51a are connected to a signal generating device (not shown) and the external conducting members 50b, 51b are each connected to a correspondingly adapted signal receiving device in the form of whip antennas 53, 54. These whip antennas may, for example, be formed as $\lambda/4$-whips or $\lambda/2$-whips. In the figures, the lengths of the antennas are exaggerated.

Figure 6B:
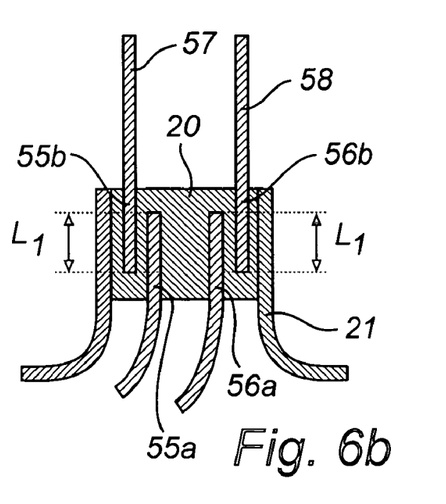
FIG. 6b is a schematic cross-section view of a second example of the fourth embodiment of the dielectric connector according to the present invention, having multiple signal receiving devices designed to improve signal reception through diversity.

In FIG. 6b, a second example of the fourth embodiment of the dielectric connector 20 according to the invention is schematically shown. This connector 20 is designed to accommodate two parallel channels for the same radio-frequency band through the provision of two pairs of internal 55a, 56a and external 55b, 56b conducting members. Between each pair 55a-b, 56a-b, there is an overlap $L_1$. Similar or like signal receiving devices 57, 58 are connected to each of the external conducting member 55b, 56b, in order to accomplish so called diversity. Diversity is here accomplished by connecting the two antennas 57, 58 through the connector 20 to two input ports on the signal generating device (not shown). Thereby, the signal strength on the input ports can continuously be monitored and the port currently having the best signal-to-noise ratio be selected.

Figure 7:
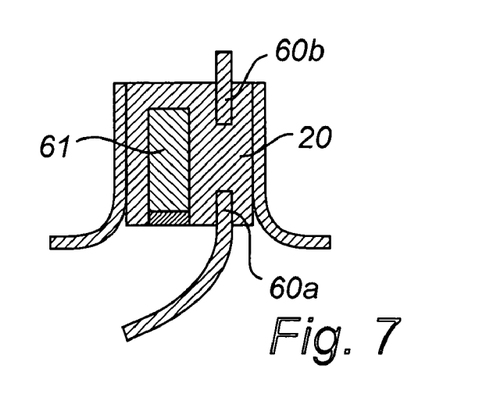
FIG. 7 is a schematic cross-section view of a fifth embodiment of the dielectric connector, having an intermediate coupling member embedded in the connector.

In the following a fifth embodiment of the dielectric connector 20 according to the present invention will be described with reference to FIG. 7. Here, a dielectric connector 20 is shown, having a pair of internal 60a and external 60b conducting members inserted in the connector along the same line parallel to the axis of the connector. Parallelly to the conducting members 60a-b, an intermediate coupling member 61, in the form of a dielectric-filled coil, is embedded. According to this embodiment, a resonant coupling from the internal conducting member 60a via the intermediate coupling member 61 to the external conducting member 60b is accomplished through a suitably dimensioned intermediate coupling member 61 and overlaps $L_i$.

Figure 8A:
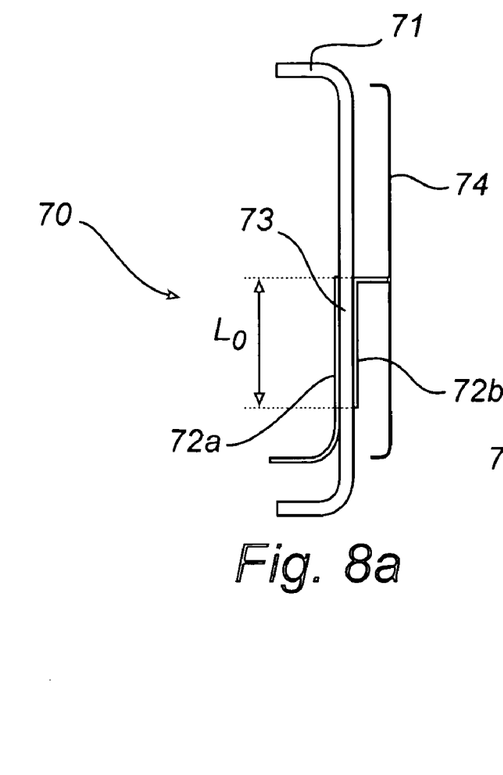
FIGS. 8a-b are schematic cross-section views of a first embodiment of the DC-insulating through-connection according to the present invention, having different signal receiving device configurations.
Figure 8B:
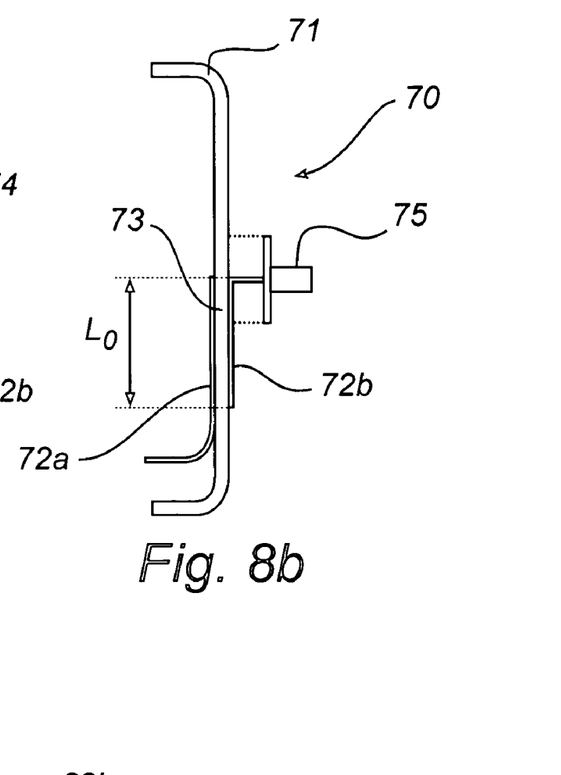

In FIGS. 8a-b schematic cross-section views of two examples of a first embodiment of the DC-insulating through-connection 70 according to the present invention, having different signal receiving device configurations, are shown.

In FIG. 8a, a first example of a DC-insulating through-connection 70 through a dielectric explosion-proof housing 71 is shown, having a pair of internal 72a and external 72b conducting members applied as patches on opposite sides of a dielectric coupling member 73, which in this case forms an integral part of the housing 71. In order to achieve resonant coupling between the internal 72a and external 72b conducting members, an overlap $L_o$ is provided. The length of the overlap $L_o$ is determined in a way similar to that described above in connection with the first embodiment of the dielectric connector of the invention. Connected to the external conducting member 72b is an signal receiving device 74 in form of a suitably dimensioned antenna.

In FIG. 8b, a second example of a DC-insulating through-connection 70 according to this first embodiment is shown. Here, the antenna 74 of FIG. 8a has been replaced by a cable connector 75 for connection of a coaxial cable (not shown). This cable can lead to an antenna positioned at a location having better reception conditions or, alternatively, directly to another electronic system such as a central control unit 6.

Figure 9:
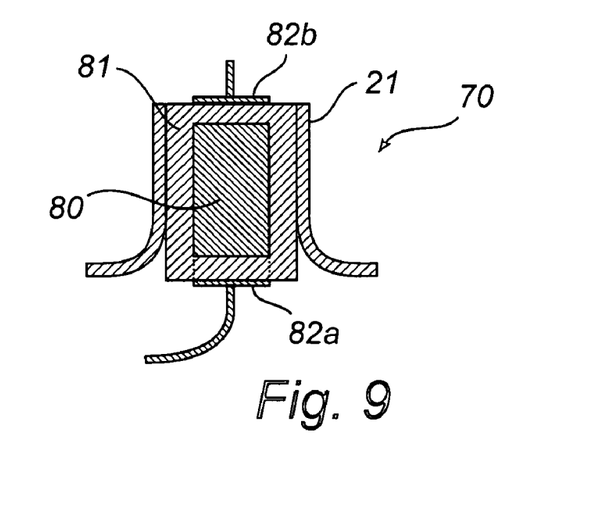
FIG. 9 is a schematic cross-section view of a second embodiment of the DC-insulating through-connection, having an intermediate coupling member embedded in the connector.

In FIG. 9 a schematic cross-section view of a second embodiment of the DC-insulating through-connection 70 is shown, where an intermediate coupling member 80 is embedded in a plug 81 forming the through-connection 60. Internal 82a and external 82b conducting members are provided as plates on the inner and outer surfaces of the plug 81, respectively. The intermediate coupling member 80 may be formed as a coil having a few turns and plates connected at the ends. The dimensions of the coil are chosen to simulate a $\lambda/2$-resonator. Preferably, the coil is filled with a dielectric material to maintain the pressure stability required for the explosion proof testing. According to this embodiment, a resonant coupling from the internal conducting member 82a via the intermediate coupling member 80 to the external conducting member 82b is accomplished through a suitably dimensioned intermediate coupling member 80.

The person skilled in the art realizes that the present invention by no means is limited to the preferred embodiments described above. On the contrary, many modifications and variations are possible within the scope of the appended claims. For example, the DC-insulating feed-through and electronic system according to the invention can be used in several other fields, such as for process monitoring and control. Furthermore, sensing systems may include several different systems, such as pressure sensing systems, flow sensing systems etc. There may further be other numbers of internal and external conducting members than the examples given in the present description. Examples of applicable frequency ranges especially include government regulated frequency bands available for civilian use.

The invention claimed is:

1. A dielectric connector, for coupling radio-frequency signals from a signal generating device disposed inside an explosion-proof housing to a signal receiving device arranged outside said housing, wherein said connector is configured to be sealingly inserted in an opening in said housing, and adapted to:

receive, from the inside of said housing, at least one internal conducting member, said at least one internal conducting member being connected to said signal generating device, and     receive, from the outside of said housing, at least one external conducting member, said at least one external conducting member being connected to said signal receiving device,     wherein said connector partly encloses at least one of said conducting members, and     wherein said connector provides reactive coupling of said radio-frequency signals, and galvanic separation between said signal generating device and said signal receiving device, when said conductive members are received by said connector.

2. A dielectric connector according to claim 1, wherein said connector is adapted to receive said at least one internal conducting member and said at least one external conducting member such that both said internal and external conducting members are partly inserted in said connector.

3. A dielectric connector according to claim 1, wherein said at least partly inserted conducting member is inserted more than 20 percent and less than 80 percent of an extent of said connector in a direction of insertion.

4. A dielectric connector according to claim 1, wherein said connector is configured to enable resonant coupling between said at least one internal conducting member and said at least one external conducting member.

5. A dielectric connector according to claim 4, wherein:
    said connector is adapted to receive said at least one internal conducting member and said at least one external conducting member such that said internal and external conducting members are partly inserted in said connector in essentially parallel directions of insertion, and
    said resonant coupling is enabled through an overlap between said conducting members in a direction parallel to said directions of insertion.

6. A dielectric connector according to claim 5, wherein an electric length of said overlap essentially corresponds to a quarter of a wavelength of said radio-frequency signals.

7. A dielectric connector according to claim 5, wherein at least one of said conducting members has a non-straight extension within the connector.

8. A dielectric connector according to claim 4, wherein said connector comprises an intermediate coupling member arranged to enable said resonant coupling between said at least one internal conducting member and said at least one external conducting member.

9. A dielectric connector according to claim 8, wherein:
    said connector is adapted to receive said at least one internal conducting member and said at least one external conducting member such that said internal and external conducting members are partly inserted in said connector in essentially parallel directions of insertion,
    said intermediate coupling member is embedded in said connector, and
    said resonant coupling is enabled through overlaps, in a direction parallel to said directions of insertion, between each of said conducting members and said intermediate coupling member.

10. A dielectric connector according to claim 8, wherein said intermediate coupling member has a non-straight extension.

11. A dielectric connector according to claim 1, wherein said connector is connectable to at least one of an antenna, a cable and an adapter, said adapter accommodating either an antenna or a cable or both simultaneously.

12. An electronic system, for use in a hazardous environment, comprising:
    a signal generating device configured to generate radio-frequency signals, said signal generating device being arranged within an explosion proof housing;
    a signal receiving device arranged outside said housing;
    a dielectric connector sealingly inserted in an opening in said housing;
    at least one internal conducting member arranged inside said housing and connecting said signal generating device and said dielectric connector, and
    at least one external conducting member arranged outside said housing and connecting said signal receiving device and said dielectric connector,
    wherein at least one of said conducting members is partly inserted in said connector, and
    wherein reactive coupling of said radio-frequency signals and galvanic separation is provided between said signal generating device and said signal receiving device.

13. An electronic system according to claim 12, wherein said dielectric connector is configured to enable resonant coupling between said at least one internal conducting member and said at least one external conducting member.

14. An electronic system according to claim 13, wherein:
    said dielectric connector is adapted to receive said at least one internal conducting member and said at least one external conducting member such that said internal and external conducting members are partly inserted in said connector in essentially parallel directions of insertion, and
    said resonant coupling is enabled through an overlap between said conducting members in a direction parallel to said directions of insertion.

15. An electronic system according to claim 14, wherein at least one of said conducting members has a non-straight extension in a vicinity of the connector.

16. An electronic system according to claim 14, wherein an electric length of said overlap essentially corresponds to a quarter of a wavelength of said radio-frequency signals.

17. An electronic system according to claim 13, wherein:
    said dielectric connector is adapted to receive said at least one internal conducting member and said at least one external conducting member such that said internal and external conducting members are partly inserted in said dielectric connector in essentially parallel directions of insertion,
    an intermediate coupling member is embedded in said dielectric connector, and
    said resonant coupling is enabled through overlaps, in a direction parallel to said directions of insertion, between each of said conducting members and said intermediate coupling member.

18. An electronic system according to claim 17, wherein said intermediate coupling member is non-straight.

19. An electronic system according to claim 12, wherein said connector is connectable to at least one of an antenna, a cable and an adapter accommodating either an antenna or a cable or both simultaneously.

20. An electronic system according to claim 12, wherein said signal receiving device is at least one of a quarter-wave whip antenna, a half-wave whip antenna, a loop antenna and a PIFA-type antenna.

21. An electronic system according to claim 12, wherein said signal receiving device is configured to protect said electronic system from over-voltage.

22. An electronic system according to claim 12, wherein said connector is configured to accommodate a plurality of signal receiving devices.

23. A DC-insulating through-connection, for coupling radio-frequency signals from a signal generating device disposed inside an explosion-proof housing to a signal receiving device arranged outside said housing, said through-connection comprising:
at least one internal conducting member, from the inside of said housing, connected to a dielectric coupling member, said at least one internal conducting member being connected to said signal generating device, and
at least one external conducting member, from the outside of said housing, connected to said dielectric coupling member, said at least one external conducting member being connected to said signal receiving device,
wherein said through-connection is configured to enable resonant coupling of said radio-frequency signals between said conducting members through said dielectric coupling member, thereby providing resonant reactive coupling and galvanic separation between said signal generating device and said signal receiving device.

24. A DC-insulating through-connection according to claim 23, wherein said resonant coupling is enabled through an overlap between said conducting members, said overlap being perpendicular to a direction of said through-connection.

25. A DC-insulating through-connection according to claim 24, wherein an electric length of said overlap essentially corresponds to a quarter of a wavelength of said radio-frequency signals.

26. A DC-insulating through-connection according to claim 23, wherein said through-connection comprises an intermediate coupling member arranged to enable said resonant coupling between said at least one internal conducting member and said at least one external conducting member.

27. A DC-insulating through-connection according to claim 26, wherein:
said intermediate coupling member is embedded in said through-connection, and
said resonant coupling is enabled through:
a first reactive coupling in a direction of said through-connection between said internal conducting member and said intermediate coupling member, and
a second reactive coupling in the direction of said through-connection between said intermediate coupling member and said external conducting member.

28. A DC-insulating through-connection according to claim 23, wherein said though-connection is connectable to at least one of an antenna, a cable and an adapter, the adapter accommodating either an antenna or a cable or both simultaneously.

29. electronic system, for use in a hazardous environment, comprising:
a signal generating device configured to generate radio-frequency signals, said signal generating device being arranged within an explosion proof housing;
a signal receiving device arranged outside said housing;
a DC-insulating through-connection comprising:
at least one internal conducting member arranged, from the inside of said housing, on a dielectric coupling member, said at least one internal conducting member being connected to said signal generating device, and
at least one external conducting member arranged, from the outside of said housing, on said dielectric coupling member, said at least one external conducting member being connected to said signal receiving device,
wherein said through-connection is configured to enable resonant coupling of said radio-frequency signals between said conducting members through said dielectric coupling member, thereby providing resonant reactive coupling and galvanic separation between said signal generating device and said signal receiving device.

30. An electronic system according to claim 29, wherein:
said resonant coupling is enabled through an overlap, perpendicular to a direction of said through-connection, between said conducting members, and
an electric length of said overlap essentially corresponds to a quarter of a wavelength of said radio-frequency signals.

31. An electronic system according to claim 29, wherein said through-connection comprises an intermediate coupling member arranged to enable said resonant coupling between said at least one internal conducting member and said at least one external conducting member.

32. An electronic system according to claim 31, wherein:
said intermediate coupling member is embedded in said through-connection, and
said resonant coupling is enabled through
a first reactive coupling in a direction of said through-connection between said internal conducting member and said intermediate coupling member, and
a second reactive coupling in the direction of said through-connection between said intermediate coupling member and said external conducting member.

33. An electronic system according to claim 29, wherein said through-connection is connectable to at least one of an antenna, a cable and an adapter accommodating either an antenna or a cable or both simultaneously.

34. An electronic system according to claim 29, wherein said signal receiving device is at least one of a quarter-wave whip antenna, a half wave whip antenna and a PIFA-type antenna.

35. An electronic system according to claim 29, wherein said signal receiving device is configured to protect said electronic system from over-voltage.

36. An electronic system according to claim 29, wherein said through-connection is configured to accommodate a plurality of signal receiving devices.

37. A radar level gauge system for determining a filling level of a filling material in a container, comprising:
a transmitter for transmitting measuring signals towards the surface of the filling material;
a receiver for receiving echo signals from the container, wherein the receiver has a signal generating device configured to generate radio-frequency signals, said signal generating device being arranged within the container;
processing circuitry for calculating based on the reflected microwave signals a distance to a substance with a reflective surface in the container, wherein the processing circuitry is connected to a signal receiving device arranged outside the container;
a dielectric connector sealingly inserted in an opening in said container;
at least one internal conducting member arranged inside said container and connecting said signal generating device and said dielectric connector; and
at least one external conducting member arranged outside the container and connecting said signal receiving device and said dielectric connector;

wherein at least one of said conducting members is partly inserted in said connector, and wherein said dielectric connector provides reactive coupling of said radio-frequency signals and galvanic separation between said signal generating device and said signal receiving device.

38. The radar level gauge system of claim 37, wherein the transmitter is adapted to emit continuous signals, and wherein the processing circuitry is adapted to calculate the distances based on a phase difference between the received echo signal and a reference signal.

39. The radar level gauge system of claim 37, wherein the transmitter is adapted to emit pulsed signals, and wherein the processing circuitry is adapted to calculate distances based on the time between the emission of a pulsed signal and the reception of the echo of said signal.

40. A radar level gauge system for determining a filling level of a filling material in a container, comprising:

a transmitter for transmitting measuring signals towards the surface of the filling material;

a receiver for receiving echo signals from the container, wherein the receiver has a signal generating device configured to generate radio-frequency signals, said signal generating device being arranged within the container;

processing circuitry for calculating based on the reflected microwave signals a distance to a substance with a reflective surface in the container, wherein the processing circuitry is connected to a signal receiving device arranged outside the container;

a dielectric connector sealingly inserted in an opening in said container;

at least one internal conducting member arranged, from the inside of said housing, to the dielectric connector, said at least one internal conducting member being connected to said signal generating device, and at least one external conducting member arranged, from the outside of said housing, to said dielectric connector, said at least one external conducting member being connected to said signal receiving device, wherein said dielectric connector is configured to enable resonant coupling of said radio-frequency signals between said conducting members, thereby providing resonant reactive coupling and galvanic separation between said signal generating device and said signal receiving device.

41. The radar level gauge system of claim 40, wherein the transmitter is adapted to emit continuous signals, and wherein the processing circuitry is adapted to calculate the distances based on a phase difference between the received echo signal and a reference signal.

42. The radar level gauge system of claim 40, wherein the transmitter is adapted to emit pulsed signals, and wherein the processing circuitry is adapted to calculate distances based on the time between the emission of a pulsed signal and the reception of the echo of said signal.

* * * * *